July 10, 1962 J. H. McLOUGHLIN 3,043,096
EXHAUST GAS PURIFIER AND MUFFLER
Filed March 14, 1961 2 Sheets-Sheet 1
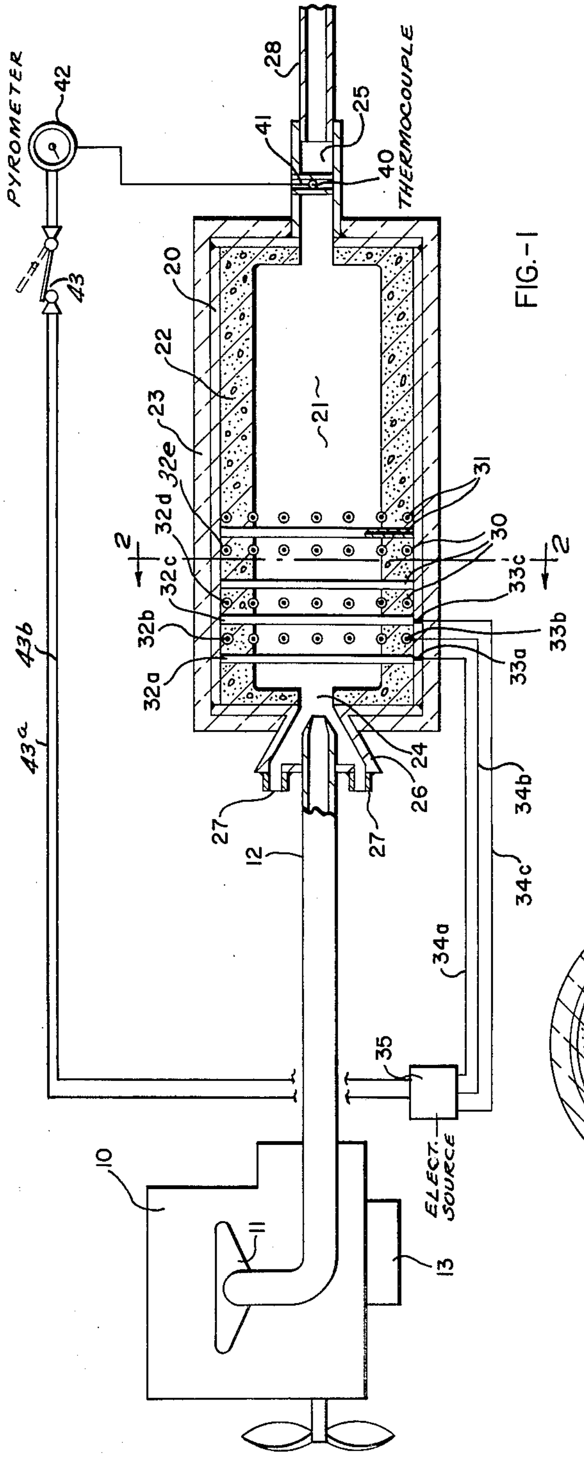
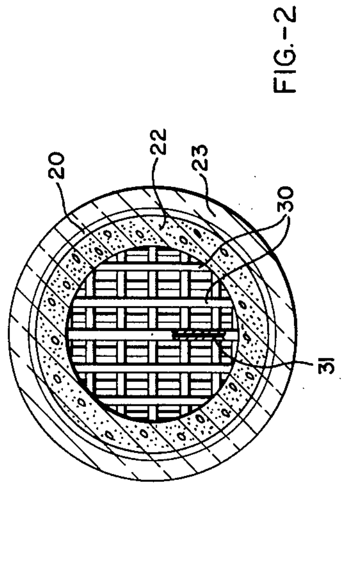
INVENTOR
JAMES H. McLOUGHLIN
BY Watts Edgerton Pyle & Fisher
ATTORNEY

EXHAUST GAS PURIFIER AND MUFFLER

Filed March 14, 1961 2 Sheets-Sheet 2

INVENTOR
JAMES H. Mc LOUGHLIN

BY
Watts, Edgerton, Ryle & Fisher
ATTORNEY

United States Patent Office 3,043,096

Patented July 10, 1962

3,043,096

EXHAUST GAS PURIFIER AND MUFFLER

James H. McLoughlin, New Hartford, N.Y., assignor to National Exhaust Purifier Co., Inc., a company of New Jersey Filed Mar. 14, 1961, Ser. No. 95,668
8 Claims. (Cl. 60—30)

This invention relates to gas purifier-muffler systems and more particularly to purifier-muffler systems adapted for use to purify the exhaust gases of internal combustion engines.

Exhaust gases emitted from an internal combustion engine include carbon dioxide, nitrogen, carbon monoxide, hydrogen, water vapor, partially oxidized hydrocarbons, and sometimes free carbon. Both the carbon monoxide and partially oxidized hydrocarbons are objectionable. Carbon monoxide is poisonous in rather small amounts and hydrocarbons have noxious odors. Further, recent research has indicated partially oxidized hydrocarbons and aldehydes containing benzpyrene found in exhaust of internal combustion engines contain carcinogenic agents of a type which are detrimental to humans, animals and plant life.

Carbon monoxide, partially oxidized hydrocarbons, and free carbon are all combustible and if completely or substantially completely oxidized are rendered harmless and non-noxious. Carbon monoxide and partially oxidized hydrocarbons are the two constituents of the exhaust of an internal combustion engine that it is most important to destroy or prevent from entering into the atmosphere.

Not only do the components of the exhaust of an internal combustion engine present a health hazard, but they also tend to form what is commonly known as "smog" under certain atmospheric conditions.

In order to prevent toxic carbon monoxide and noxious partially oxidized hydrocarbons from entering the atmosphere it is necessary either to prevent their formation, or if they are formed to render them non-toxic and non-noxious. No known commercial method has yet been provided for preventing the formation of such noxious and toxic components of an internal combustion engine. There are, however, several prior proposals for rendering these components non-toxic and/or non-noxious. There are two basic approaches to the problem of rendering the components harmless. One approach is that of a catalyst to promote a reaction rendering the components non-toxic and non-noxious, and the other is a thermic oxidation. This invention relates to the latter type.

This invention provides electrically heated elements for raising the temperature of exhaust gases and mixed air above the temperature to commence oxidation of the carbon monoxide and partially oxidized hydrocarbons, and also provides "self-sustaining" non-externally heated elements for sustaining the temperature of the mixed gases above their oxidation reaction temperature. The self-sustaining elements are heated by the exothermic reaction of the oxidation of the carbon monoxide and partially oxidized hydrocarbons. The heated elements may be selectively heatable when the temperature of the gases in the purifier-muffler is below a predetermined, pre-selected value.

It is a principal object of this invention to provide an exhaust gas purifier-muffler which will oxidize unoxidized and partially oxidized components of the exhaust from internal combustion engines.

A general object of this invention is to provide an exhaust gas purifier-muffler which will raise the temperature of the exhaust gases from an internal combustion engine to above a pre-selected value to cause a reaction of exhaust gas constituents with oxygen.

Another more particular object of this invention is to provide an exhaust gas purifier-muffler having at least one electrically heated element to raise the temperature of exhaust gases from an internal combustion engine above a pre-selected value.

A more specialized object of this invention is to provide a gas purifier-muffler having at least one electrically heated element to raise the temperature of the exhaust gases above a pre-selected temperature and at least one self-sustaining element to utilize the temperature created by the exothermic reactions in oxidation.

Expressed another way a more special object of this invention is to provide a gas purifier-muffler which will raise the temperature of exhaust and oxidation gases by electrically heated means above a pre-selected value and in which the heat of reaction of the exothermic reaction of oxidation of exhaust gases is retained to sustain oxidation.

A further object of this invention is to provide a plurality of electrically heatable elements adjacent the exhaust gas inlet of a gas purifier-muffler and a plurality of heat absorbing elements in the purifier-muffler between the electrically heated elements and the exhaust gas outlet.

Another more general object of the invention is to provide an exhaust gas purifier and muffler in which electrical energy is selectively provided to maintain exhaust gases and mixed oxygen above a preselected temperature.

Yet another more general object of this invention is to provide a method of purifying exhaust gases from an internal combustion engine.

Other objects and a fuller understanding of the invention may be had by referring to the following description and claims taken in conjunction with the accompanying drawings, in which:

FIGURE 1 is a sectional view of the exhaust gas purifier-muffler;

FIGURE 2 is an end view taken along the plane designated by line 2—2 of FIGURE 1 with the elements being shown somewhat schematically;

Figure 3:
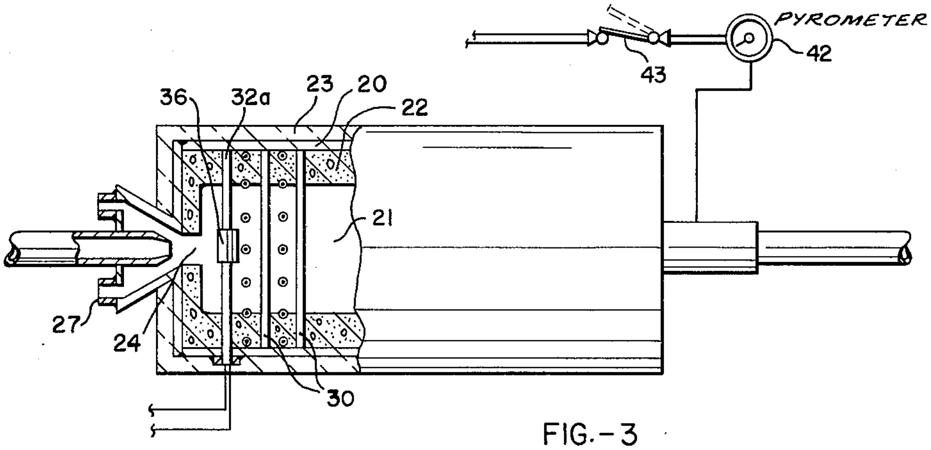
FIGURE 3 is another embodiment of the device for heating the gases in a purifier-muffler.

Referring now to the drawings, an internal combustion engine is schematically represented and designated generally as 10. The engine 10 has an exhaust manifold 11, and exhaust pipe 12, and a crank case 13.

The novel and improved exhaust gas purifier-muffler includes a housing 20 defining an internal combustion chamber 21. The housing 20 has a ceramic inner wall lining 22 and external heat insulation 23. A gas inlet 24 is formed at one end of the housing and a gas outlet 25 is formed at the opposite end of the housing. A frusto-conically shaped venturi pipe 26 having a venturi opening 27 is carried by the housing 20 and communicates with the internal chamber 21 through the gas inlet 24. The exhaust pipe 12 projects into and terminates in the venturi pipe 26. A tail pipe 28 is connected to the housing 20 and is in communication with the chamber 21 through the gas outlet 25. The tail pipe carries away the gases including the reactive products from the chamber 21.

Disposed within the internal chamber 21 are a plurality of wires 30 having ceramic covering 31. As can best be seen in FIGURES 1 and 2 the wires 30 are divided into several banks **32*a*, 32*b*, 32*c*, 32*d*, etc. that are located at spaced stations. The wires in each bank are carried by the housing 20 and disposed parallel and coplaner with each other and transverse to the axis of the chamber 21**. Thus, at each station there is a gridlike structure defining a plurality of elongated openings. Preferably the planes of each bank are parallel. Preferably, the long axis of the openings in one bank are at about 90° with respect to the like axis of the openings of the banks at adjacent stations.

Several of the banks near the inlet are provided with electrical contact terminals 33*a*, 33*b* and 33*c*. The number of banks which must have terminals differs for different applications as will be explained more fully hereinafter. In the illustrated embodiment the banks 32*a*, *b* and *c* are shown with terminals 33*a*, *b* and *c* respectively. The terminals 33*a*, *b*, and *c* have conductors 34*a*, *b* and *c* respectively, each connected to a source of electric power 35. The source of electric power is preferably a storage battery supplied for starting the engine and connected to an alternating generator or an alternating generator alone.

The exhaust gases flow through the exhaust pipe into the venturi pipe and thence into the internal chamber 21 drawing air along with them through the venturi inlet opening 27. The venturi may be omitted if the exhaust gas contains enough uncombined oxygen for complete combustion. The banks of wires 32*a*, *b* and *c* are heated by electrical current from the power source 35. Oxidation of carbon monoxide and partially-oxidized hydrocarbons is best accomplished at temperatures above 450° F. Hence, enough electric current is supplied to the wires 30 of banks 32*a*, *b* and *c* to raise their temperature above 450° F. This will commence the oxidation of the gas entering the internal chamber 21.

The oxidation reaction is exothermic; thus, after the reaction has commenced, heat is generated from the reaction. A part of this heat is retained by the remaining banks of wires 32*d*, *e*, etc. These banks could be characterized as self-sustaining banks inasmuch as once the reaction is progressing, the heat of the reaction will provide the necessary heat to insure that it continues throughout the length of the purifier-muffler. Also, a part of this heat from the exothermic reaction is retained by the ceramic lining of the housing to help maintain the oxidation reaction. A substantial portion of the carbon monoxide, aldehydes, and partially-oxidized hydrocarbons are completely oxidized into carbon dioxide, water vapor, and fully-oxidized hydrocarbons, respectively, and, thence, exhausted through the outlet 25 and the tail pipe 28 into the ambient atmosphere.

Fully oxidized hydrocarbons, water vapor, and carbon dioxide exhausted into the atmosphere are non-poisonous and non-noxious. Thus, the exhaust gas from the engine which may contain high amounts of carbon monoxide and partially oxidized hydrocarbons is rendered harmless and non-noxious by oxidation of a substantial portion of the carbon monoxide and partially oxidized hydrocarbons in the chamber 21 and exhausted in a "safe" state.

As has been indicated above, the oxidation of the carbon monoxide and partially oxidized hydrocarbons is exothermic. In order to commence the reaction it is necessary to heat these gases with the mixed air above 450° F. However, once the action has commenced, the heat generated by the exothermic reaction can be retained by the ceramic covered wires 30 and the need for electrically heating the wires is eliminated. Although no harm will be done in continuing to heat the wires, it is nevertheless a drain on the power source and is really not necessary. For this reason a thermocouple 40 is provided in a thermocouple well 41 preferably formed in the tail pipe 28 adjacent the outlet 25. The thermocouple 40 is connected to a pyrometer 42 which in turn is connected to a temperature activated switch 43. The switch 43 is operably connected to the electirc source 35 by leads 43*a* and 43*b* to control the flow of current to the wires 34*a*, *b* and *c*. When the temperature of the exhausting gases is above a preselected amount the pyrometer will cause the switch 43 to open, as illustrated by the broken lines in FIGURE 1, and interrupt the flow of current to the wires. When the temperature of the gases in the tail pipe falls below a preselected value, the pyorometer will cause the switch 43 to close, as shown in the solid line position in FIGURE 1, and thus provide current to electrically heat the banks of wires 32*a*, *b* and *c*.

The number of banks of wires that must be heated is dependent upon the application of the purifier-muffler. Enough banks must be heated to heat the mixed gases to a temperature above 450° F. under the coldest entering conditions of the gases. Relatively simple experimentation will provide the answer as to the number of banks and wires which must be heated. Among other factors contributing to the number of wires that must be heated are the relative efficiency of the engine, type of engine, the volume of exhaust gas, and the type of fuel used.

Referring now to FIGURE 3, another embodiment of the heating device is shown. In this embodiment, a single heater 36 is carried by the wires 30 of the bank 32*a* adjacent the inlet 24. This heater may be connected through the switch 43 to the pyrometer 42 in a manner similar to the connection shown in FIGURE 1.

Figure 4:
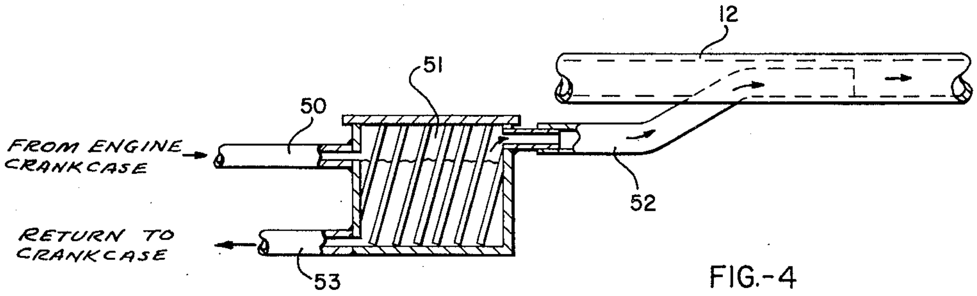
FIGURE 4 is a side elevational view somewhat schematic showing the connection of an oil-fume filter; and, FIGURE 5 is another embodiment of the purifier-muffler showing a different type of air introduction pipe.

FIGURE 4 is a schematic representation of how the fumes emitted from the crank case which are normally discharged in the atmosphere through some type of breather pipe may be oxidized and discharged in a nonnoxious non-poisonous state. The crank case 13 is connected by an oil-fume line 50 to an oil-fume filter 51. A fume discharge pipe 52 is connected to the filter 51 and leads into the exhaust pipe 12 where the fumes are carried with the exhaust by a venturi action. The filter 51 has an oil return line 53 which will return the filtered liquid oil back to the crank case.

Figure 5:
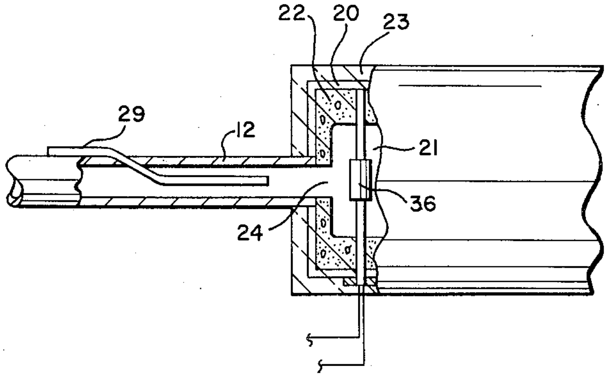

Referring now to FIGURE 5, another air-inlet venturi is shown. This takes the form of an elongated pipe 29 with one end projecting into the exhaust pipe 12 and the other end communicating with the atmosphere to provide the necessary air. In this embodiment the exhaust pipe 12 is connected to the housing 20 and communicates directly with the internal chamber 21 through the inlet 24.

In summary, it is believed that this invention comprises a gas purifier having electrically heatable means which exhaust gas and mixed air are passed. Further, it is believed that this invention includes the method of purifying exhaust gas by raising the temperature of exhaust gas and mixed air above the temperature necessary to commence oxidation reaction by electrical means.

Although the invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An exhaust purifier for use in conjunction with an internal combustion engine comprising a housing having an internal combustion chamber for oxidizing exhaust gases, said chamber having an inlet end for receiving exhaust gases from said engine and an outlet end for discharging oxidized exhaust gases, and means in said combustion chamber for raising and maintaining the exhaust gases at their combustion temperature until the gases are oxidized, said means including a first grid disposed at the inlet end of said combustion chamber and extending transversely to the longitudinal axis of said housing, said first grid being formed by a series of crossed wires that define a plurality of elongated openings, electrical heating means connected to said first grid for electrically heating the wires thereof to raise the exhaust gases to their combustion temperature, and a second gird spaced from said first grid and extending parallel thereto, said second grid being formed by a series of crossed wires that define a plurality of elongated openings oriented at 90° with respect to the elongated openings in said first grid.

2. The exhaust purifier as claimed in claim 1 wherein said second gird is heated solely by the oxidization of the exhaust gases and acts to retain the heat of combustion for maintaining the gases at their combustion temperature.

3. The exhaust purifier as claimed in claim 2 including temperature sensing means at the outlet end of said combustion chamber, said temperature sensing means being in circuit relation with said electrical heating means for shutting off said electrical heating means when the temperature of the oxidized exhaust gases reaches a predetermined level.

4. In combination with an internal combustion engine including an exhaust manifold and a crankcase, an exhaust purifier comprising a housing having an inlet end and an outlet end, said housing having an internal combustion chamber, conduits connecting said manifold and said crankcase to the inlet end of said housing, a separator interposed between said crankcase and said purifier for separating liquids from gases, a return conduit between said separator and said crankcase for returning liquids to said crankcase, and heating means in said combustion chamber for causing oxidation of exhaust gases, said heating means including means for heating the exhaust gases to their combustion temperature and means for retaining heat to maintain the gases at their combustion temperature.

5. The combination of claim 4 wherein said means for heating the exhaust gases comprises a first grid structure disposed at the inlet end of said housing and extending transversely of its longitudinal axis, said first grid having a plurality of rectangular openings, and electrical heating means connected to said first grid structure; and wherein said means for retaining heat comprises a second grid structure spaced from said first grid structure toward the outlet end of said housing, said second grid structure having a plurality of rectangular openings oriented 90° with respect to the openings of said first grid structure.

6. The combination of claim 5 including temperature sensing means at the outlet end of said housing, said temperature sensing means being in circuit relation with said electrical heating means for shutting off said electrical heating means when the temperature of the oxidized exhaust gases reaches a predetermined level.

7. An exhaust purifier for use in conjunction with an internal combustion engine comprising a housing having an internal combustion chamber for oxidixing exhaust gases, said chamber having an inlet end for receiving exhaust gases from said engine and an outlet end for discharging oxidized exhaust gases, heating means in said combustion chamber for raising and maintaining the exhaust gases at their combustion temperature until the gases are oxidized, and temperature-responsive control means for automatically actuating and de-actuating said heating means, said control means including temperature sensing means at the outlet end of said combustion chamber, said temperature sensing means being in electrical circuit relation with said heating means for turning on said heating means when the temperature of the exhaust gases is below a predetermined level and shutting off said heating means when the temperature of the oxidized exhaust gases is above said predetermined level.

8. In combination with an internal combustion engine including an exhaust manifold and a crankcase, an exhaust purifier comprising a housing having an inlet end and an outlet end, said housing having an internal combustion chamber, conduits connecting said manifold and said crankcase to the inlet end of said housing, a separator interposed between said crankcase and said housing for separating liquids from gases, a return conduit between said separator and said crankcase for returning liquids to said crankcase, heating means in said combustion chamber for causing oxidation of influent gases from said crankcase and said manifold, and temperature-responsive control means for automatically operating said heating means, said control means including temperature sensing means at the outlet end of said housing for detecting the temperature of the exhaust gases, said temperature sensing means being in circuit relation with said heating means for turning on said heating means when the temperature of the exhaust gases is below a predetermined level and shutting off said heating means when the temperature of the oxidized exhaust gases is above said predetermined level.

References Cited in the file of this patent

UNITED STATES PATENTS

| | | |
|---|---|---|
| 1,605,484 | Thompson et al. | Nov. 2, 1926 |
| 1,756,897 | Bilsky | Apr. 29, 1930 |
| 1,843,999 | White | Feb. 9, 1932 |
| 1,858,637 | McDonald | May 17, 1932 |
| 1,985,713 | Bartlett | Dec. 25, 1934 |
| 2,203,554 | Uhri et al. | June 4, 1940 |
| 2,649,685 | Cohen | Aug. 25, 1953 |
| 2,728,408 | Deliman | Dec. 27, 1955 |
| 2,811,425 | Houdry | Oct. 29, 1957 |